March 11, 1941.     A. RYNER     2,234,385
APPARATUS FOR REMOVING IMPURITIES FROM
GASES BY THE AID OF A WASHING LIQUID
Filed June 6, 1940
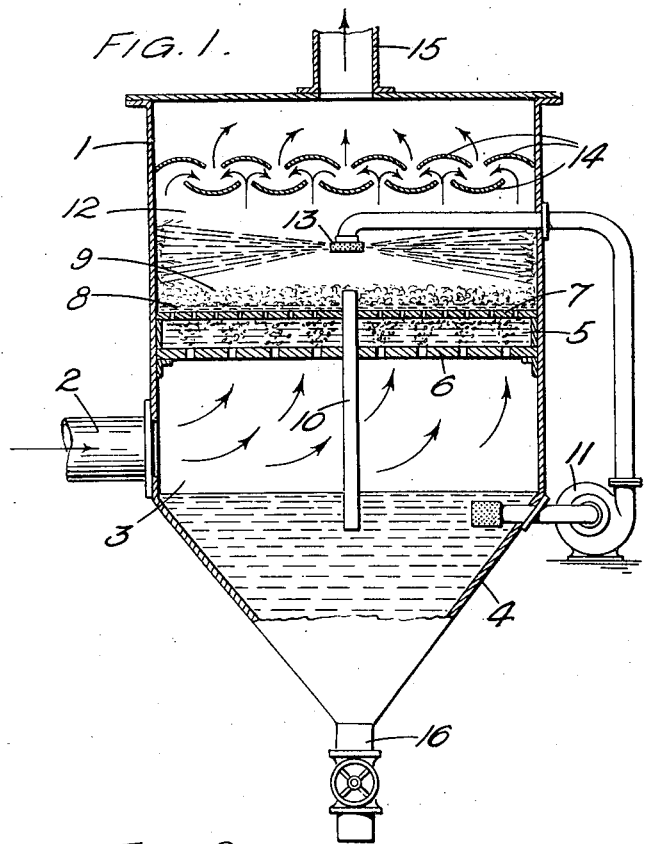
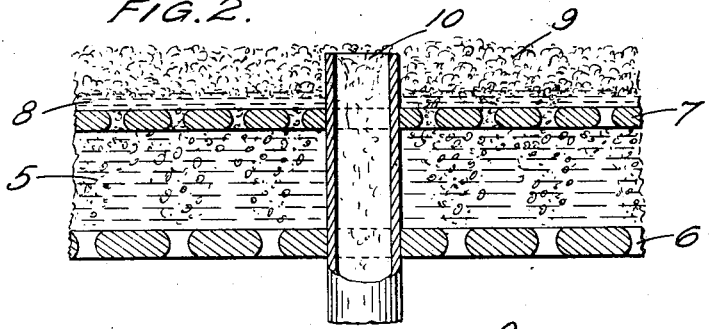
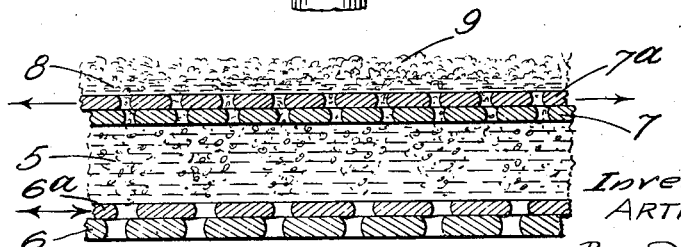
Inventor.
ARTHUR RYNER
By Ely & Frye
Attny.

Patented Mar. 11, 1941

2,234,385

UNITED STATES PATENT OFFICE 2,234,385

APPARATUS FOR REMOVING IMPURITIES FROM GASES BY THE AID OF A WASHING LIQUID

Arthur Ryner, London, England, assignor to Traughber Engineering Company, Cleveland, Ohio, a corporation of Ohio Application June 6, 1940, Serial No. 339,147
In Great Britain February 23, 1939

4 Claims. (Cl. 261—113)

This invention relates to an improved apparatus for the removal of impurities, especially such in the form of dust or other fine particles, from air and other gases. It is more particularly concerned with an improved apparatus of the kind in which a washing liquid, such as water, and a wetting agent, such as an oil with a low surface tension, carried upon the surface of the washing liquid in the form of a froth or foam are caused to contact with the impurities and to remove them from the gases.

It has been proposed, in the specification of British Patent No. 485,155 for example, that the gases to be purified should be forced to pass below the level of the water by means of bells or caps which surmount gas risers projecting up through the water. The flow of gases may be divided into a number of fine streams, for example by serrating the edge of the bell, and thereby bringing the said gases into intimate contact with the water over which a froth of the water and oil is maintained. It is one object of the invention to provide improvements or simplifications applicable to such prior proposals.

It has also been proposed that air to be purified should be drawn or forced through perforated sheets over which water is sprayed, the pressure of the air tending to prevent the water from escaping through the perforations. Various difficulties have prevented the use of this proposal in practice: For one thing, it is virtually impossible to distribute the air pressure evenly, so that the air will pass uniformly through all the perforations. Now the pressure and velocity of the air must everywhere be high enough to prevent the water from escaping through the perforations. If this is the case, however, there will be a tendency, at some of the perforations at least, for the air to rush through in such fashion as to form a "pipe" through the body of water. The air passing through this "pipe" will naturally tend to carry the impurities with it and only a small proportion will be washed out. It is an object of the invention to avoid these difficulties.

It has been recognised that in order to avoid the difficulties in question, it will be necessary to break up or baffle the gas flow through each perforation and to prevent it rushing straight through the liquid or splashing the latter upwardly. It is further advantageous to reduce the velocity or pressure of the gases while they are passing through the liquid so that the gases emerge therefrom uniformly and without violent agitation.

According to the present invention, the gases to be purified are passed upwardly through a body of liquid which fills the space between two perforated plates spaced apart one above the other, the said liquid being so maintained in relation to the perforated plates under the pressure of the gases.

Apparatus made in accordance with the invention, therefore comprises two perforated plates disposed one at a distance above the other, means for producing below the lower plate a pressure higher than obtains above the upper plate, and means for maintaining above the lower plate a body of liquid which fills the space between the two plates.

The provision of a body of liquid filling the space between two perforated plates has been found to be very effective for breaking up and reducing the velocity or pressure of the gases, the combined action of the plates and liquid causing efficient cleaning of the gases.

The perforations in the two plates may be out of alignment to promote breaking up or baffling the gas flow. Preferably the perforations in the upper plate are smaller than those in the lower plate. They may also be closer together. Indeed the total cross-section for the passage of gases through such smaller perforations in the upper plate is advantageously larger than that for their passage through the lower plate. In this fashion, not only can the upward splashing or entrainment of the liquid be prevented, but also the velocity or pressure of the gases can be very advantageously reduced.

If a froth is formed above the upper plate by the addition of a wetting agent, it is found that this is more compact and firm than the froth which has been produced heretofore. This froth effectively retains impurities which are not wetted by or not soluble in, say, water alone.

If desired a slight column of liquid may also be maintained above the upper plate to support the froth.

In order to enable the invention to be readily understood, reference is directed by way of example to the accompanying drawing in which—

Figure 1 is a sectional elevation of one form of apparatus in accordance with the present improvement and operative for carrying out the improved method.

Figure 2 is a fragmentary sectional view showing an advantageous construction of the perforated plates to a larger scale than Figure 1, and Figure 3 is a similar view illustrating a modification.

The apparatus shown in Figure 1 comprises a casing or tower 1 having a gas inlet 2 leading into a lower chamber 3 beneath which a deep body of liquid is maintained in the sump part 4 of the casing.

From the lower chamber 3 the gases pass out through a body of washing liquid 5 maintained between two perforated plates 6, 7 supported one above the other in the casing 1. Advantageously, and as shown by way of illustration in Figure 2, the perforations in each plate are rounded, or they may be chamfered, towards both sides of the plate. This allows of the use of comparatively thick self-supporting plates, that is plates which will not buckle under the weight of liquid carried, without the air-flow resistance and power consumption for pumping the gases being excessive. Moreover, if desired, the plates may be stiffened by ribs on the upper and/or lower sides thereof as will be understood without illustration.

A fan or air pump (not shown) is employed to draw or force the gases through the plates 6, 7 and the body of liquid 5. The perforations of the upper plate 7 are shown made smaller, and disposed closer together, than those in the lower plate, the total cross-section of the perforations in the upper plate preferably being larger than that of the perforations of the lower plate. The number, size and shape of the perforations may be selected so that the level of the liquid at the plates is maintained automatically in appropriate relationship to the pressure of the gases, that is, if the pressure becomes less than is required to maintain a given level, a corresponding quantity of liquid will escape through the perforations until equilibrium is reestablished. If the fan or air pump is stopped, all the liquid escapes through the perforations, carrying with it accumulated impurities removed from the gases. The plates can thus be cleared of impurities without further trouble.

Preferably, a slight column of liquid 8 is maintained above the level of the upper plate 7 to support a layer of froth 9 supplied by adding a wetting agent to the liquid. The maximum level of the liquid 8 above the plate 7 is determined in per se known manner by an overflow 10 projecting up through the plates. Overflowing liquid, carrying impurities with it, is conducted to the sump 4 where separation is effected. The liquid, for example water with oil to create the froth 9, is returned by a pump or pumps to the upper chamber 12 of the casing 1 at 11 for re-use and may, as shown, be sprayed over the upper plate 7 by a spray device 13 adapted to form a horizontal spray as shown. Baffle devices 14 may be placed near the top of the casing or tower 1 to trap liquid or moisture from the gases before passing to the outlet 15. 16 is a valved outlet for removal of sludge from the sump 4.

In the operation of the apparatus, the liquid is projected through the spray device 13 into the upper chamber 12 above the plate 7. It fills the space between the plates 6, 7 and this space is maintained full of liquid under the action of the pressure of the gases in the lower chamber 3. By reason of the use of the two plates 6, 7 the body of washing liquid 5 can be prevented from being forced above the top plate and the velocity or pressure of the gases reduced inside the space between the two plates so that the gases are effectively cleaned. The size and number of perforations in the bottom plate would suitably be such that the pressure of the gases below the bottom plate 6 would maintain the desired column of washing liquid above that plate, whereas the number and size of the perforations in the upper plate would be calculated so that the body of washing liquid 5 would not be forced above it and the plate would effectively subdivide and deflect the streams of gases coming through the perforations in the lower plate and, if desired, maintain the slight column of liquid 8 above the upper plate to support the layer of froth 9.

It will be realised that the depth of the column of liquid above the lower plate 6, whether it extends over the upper plate or not, can be regulated by the pressure and therefore the velocity of the gases, by the relative sizes of the perforations of the plates, and by the height of the overflow such as 10. The area of the overflow must have appropriate relation to the pressure below the plate 6 otherwise the liquid will build up a wall around it and it will not function properly. There may, of course, be more than one overflow.

According to the modification shown in Figure 3, perforated slides 6a, 7a are applied to the respective plates 6, 7 so that the effective size of the perforations of the plates can be enlarged or decreased to obtain desired adjustments.

In some circumstances means may be provided for adjusting the distance between the two perforated plates 6 and 7.

What I claim is:

1. In an apparatus for removing impurities from gases, a lower plate having a plurality of spaced perforations, an upper plate having a plurality of spaced perforations, the cross-sectional area of each of the perforations in said upper plate being less than the cross-sectional area of each of the perforations in said lower plate and the spacing between adjacent perforations in the upper plate being less than the spacing between adjacent perforations in said lower plate, means producing below the lower plate a gas pressure higher than the gas pressure above the upper plate, and means for substantially filling the space between the upper and lower plates with a body of gas washing liquid.

2. In an apparatus as described in claim 1 in which the total cross-sectional area of the perforations in the upper plate is greater than the total cross-sectional area of the perforations in the lower plate.

3. In an apparatus as described in claim 1, means for adjusting the effective cross-sectional area of the perforations in the upper and lower plates.

4. In an apparatus as described in claim 1 in which the longitudinal section of the perforations in the upper and lower plates are substantially Venturi-shaped.

ARTHUR RYNER.